(12) United States Patent
Kim

(10) Patent No.: US 6,342,895 B1
(45) Date of Patent: Jan. 29, 2002

(54) APPARATUS AND METHOD FOR MEMORY ALLOCATION

(75) Inventor: Woo-jin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/221,982

(22) Filed: Dec. 29, 1998

(30) Foreign Application Priority Data

Dec. 31, 1997 (KR) .............................................. 97-81041

(51) Int. Cl.⁷ .................................................. G09G 5/39
(52) U.S. Cl. ...................... 345/531; 348/699; 348/714; 348/718
(58) Field of Search ................................ 345/531, 545, 345/547; 348/699, 714, 718

(56) References Cited

U.S. PATENT DOCUMENTS

| 5,872,577 A | * | 2/1999 | Perrin ......................... 345/521 |
| 5,883,679 A | * | 3/1999 | Iskarous et al. ............ 348/699 |
| 5,926,573 A | * | 7/1999 | Kim et al. ................... 382/239 |
| 6,005,624 A | * | 12/1999 | Vainsencher ................ 348/413 |
| 6,021,249 A | * | 2/2000 | Kitamura ...................... 386/33 |

* cited by examiner

*Primary Examiner*—Kee M. Tung
(74) *Attorney, Agent, or Firm*—Fleshner & Kim, LLP

(57) ABSTRACT

A memory allocation method and apparatus is disclosed in which the macro blocks are grouped into a plurality block sets and stored in the memory as block set. By grouping and storing the macro blocks, an efficient reading of the data is achieved.

18 Claims, 10 Drawing Sheets

Macroblock Set

Macroblock Set

APPARATUS AND METHOD FOR MEMORY ALLOCATION

BACKGROUND OF THE INVENTION

1. Field of the Invention

The present invention relates to a MPEG decoder and more particularly to a memory allocation technique for decoded image data in the MPEG decoder.

2. Background of the Related Art

FIG. 1 shows a construction of an READ/WRITE controller of SDRAM in the MPEG decoder, which includes a display controller 1, a motion compensator 2, a audio/subpicture processing unit 3, a SDRAM 4, and a memory controller 5. The display controller 1, the motion compensator 2, and the audio/subpicture processing unit 3 are all linked to the memory controller 5 by an address & data bus (iaddr, idbus) and a control bus. The memory controller 5 is also linked to the SDRAM 4 by control signals, memory address (maddr) and memory data bus (mdbus).

The recovery of the image data from the input compressed data, the motion compensation, the audio/video signal processing, and display processing are accomplished in the display controller 1, the motion compensator 2, and the audio/subpicture processing unit 3 by accessing the SDRAM 4 through the memory controller 5. The MPEG image data is stored in the external memory SDRAM 4 and is read repeatedly by the display controller 1 and the motion compensator 2. The MPEG image data for a picture is generally divided into macro blocks (MB0 . . . MBn*m−1) as shown in FIG. 2 having a luminescence of 16*16 & color data.

A timing diagram of the READ cycle for the SDRAM 4 is shown in FIG. 3, wherein a clk represents a clock signal, a csb represents a chip select signal, a rasb represents a row address strobe signal, a casb represents a column address strobe signal, a maddr represents a memory address signal, and a mdbus represents a memory data signal. Also, a Trcd representing an active to column command requires 3 clks, a Tras representing an active to precharge requires 6 clks, a Trp representing a precharge to active requires 3 clks, a Tapr representing a last data out to active requires 1 clk, a Trc representing a row cycle time requires 9 clks, and a Trrd representing an active to active bank requires 2 clks.

As shown in FIG. 3, in order to read the data stored in the SDRAM 4, the appropriate bank must first be precharged prior to activating the bank and a row. Upon activation of the row, a column address is designated and the data is read after a fixed of column latency (CL). Following the read process, the bank is precharged for the next read cycle.

During the reading process, the data in a different bank may be read continuously even if the data is in a different row, as shown in FIG. 4. However, the data in a different row of the same bank may be read only after an internal precharging and an activation of the new row and bank, as shown in FIG. 5. The data in a different row of the same bank cannot be read continuously. A period of Tpenalty, usually 6 cycles, is required to read such data. FIG. 6 shows a memory map obtained by an allocation method in the related art. Such allocation method results in the case as shown in FIG. 5 and is generally used as a method for storing a decoded image data.

The allocation method illustrated in FIG. 6 is a technique for continuously storing pixels in the units of scan lines depending upon the display system used. The same hatching indicates one scanning line. In this case, an interlaced scanning is performed to map the top and bottom fields and the motion vectors are stored at random. When motion vectors are designated as shown in FIG. 6, data should be read in the order of 1, 2, 3, 4 for the purpose of field motion compensation.

However, the data are stored in four different rows of the same bank. As a result, the data cannot be read continuously, but must be cut-off or interrupted three times with the Tpenalty period. Because the time required for reading data stored according to this allocation method greatly depends on the storage location of the data, the maximum value of the bandwidth is significantly increased as the data are stored randomly.

In decoding a Bidirectional (B) frame type of picture, the decoder repeatedly requires the data of an Intra (I) and Predictive (P) frame types of pictures which have been decoded by an MPEG decoder. Because the amount of data required in one reading low, the time to process all the necessary data for transmission takes a large portion of the time available to transfer the data. Thus, a wide bandwidth is required.

Also, the data for motion compensation at the MPEG decoder are situated over several scan lines. Thus, the data for motion compensation cannot be read and transmitted continuously, but requires a delay time. Accordingly, the bandwidth of memory is again increased.

The present invention proposes a memory allocation method and its apparatus for storing a decoded image data as macro block sets. According to the present invention, the decoded image data are grouped in blocks appropriate to the size of the memory. Thereafter, the data blocks are stored in the memory, thereby minimizing the cut-off effect in reading out the data and reducing the memory bandwidth required. Thus, the present allocation method allows a high speed reading of data.

SUMMARY OF THE INVENTION

Accordingly, an object of the present invention is to solve at least the problems and disadvantages of the related art.

An object of the present invention is to provide a memory allocation method for an efficient reading and writing a decoded image data.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a memory allocation method according to the present invention stores/reads the decoded data in block sets in/from a memory by grouping the data blocks into sets of blocks and storing the block sets in the memory in block sets.

In another embodiment of the present invention, a memory allocation apparatus includes a memory storing and outputting the data in the unit of block sets, and a memory controller controlling the storing/reading of data in the block sets in/from the memory. The memory controller also constructs set of blocks by grouping a plurality of the data into one block set, the number of data to be grouped being the maximum number nearest to the allowable range of memory size. The memory controller includes a counter determining the number of macro blocks and a direction determination unit determining the direction in construction of the block sets according to the number of blocks of the display data in the vertical or horizontal direction. The block set is constructed by grouping the display data in the block unit vertically or horizontally.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Reference will now be made in detail to the preferred embodiments of the present invention, examples of which are illustrated in the accompanying drawings.

Figure 1:
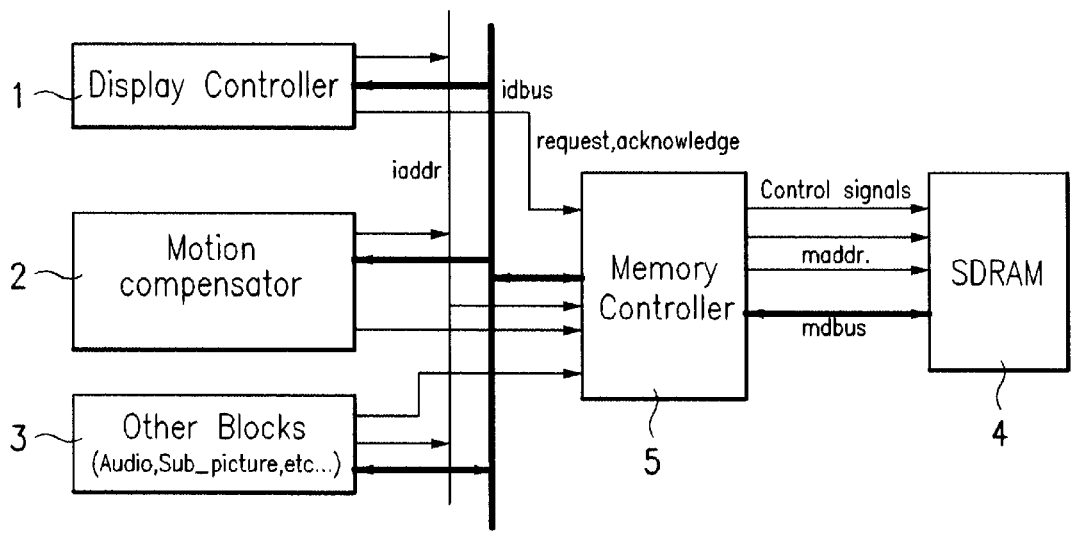
FIG. 1 is a block diagram of the READ/Write control of SDRAM in an MPEG decoder in the related art.
Figure 2:
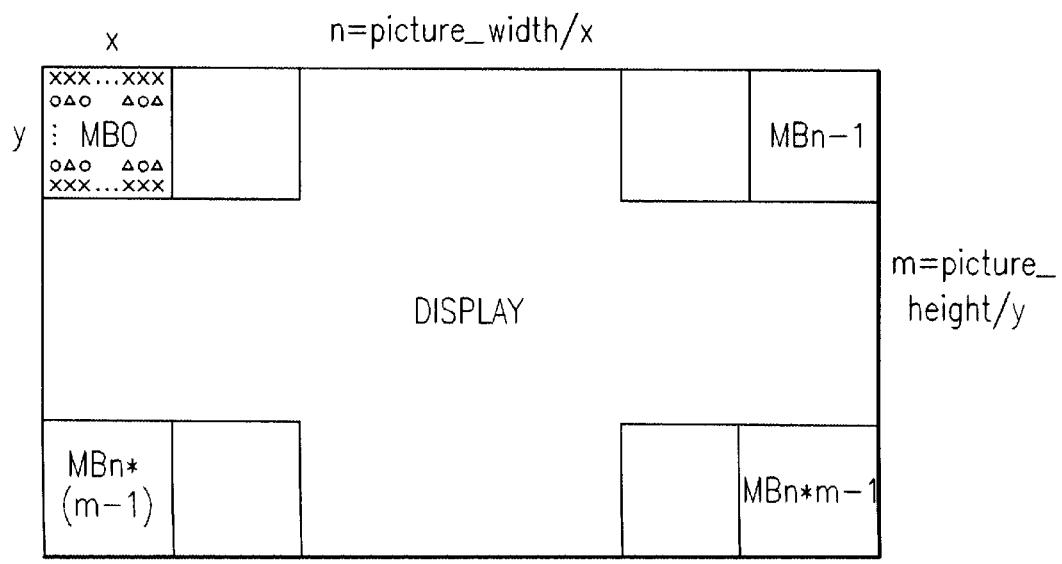
FIG. 2 is a diagram illustrating the construction of a display data.
Figure 3:
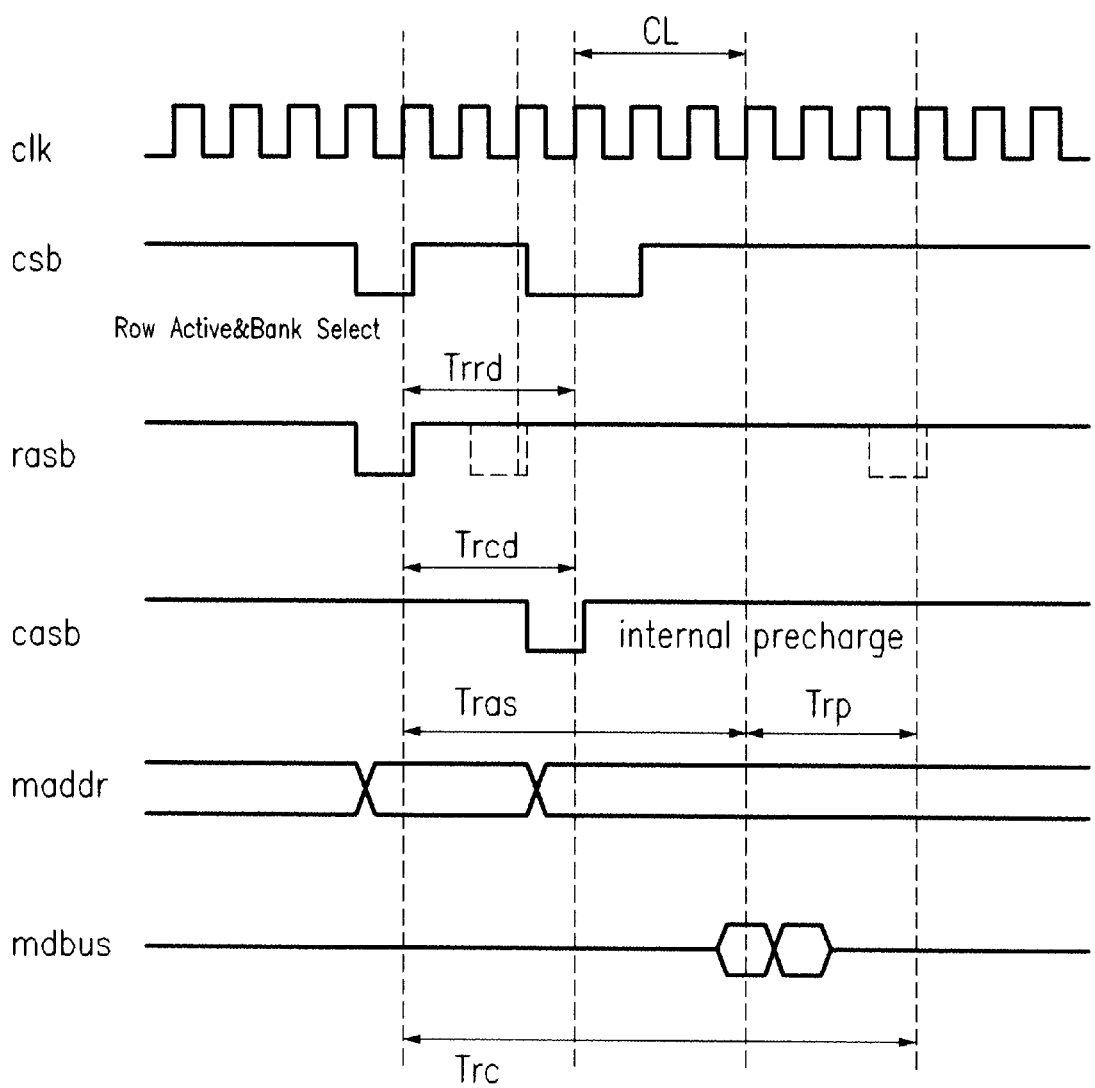
FIG. 3 is a timing diagram of the read cycle of SDRAM.
Figure 4:
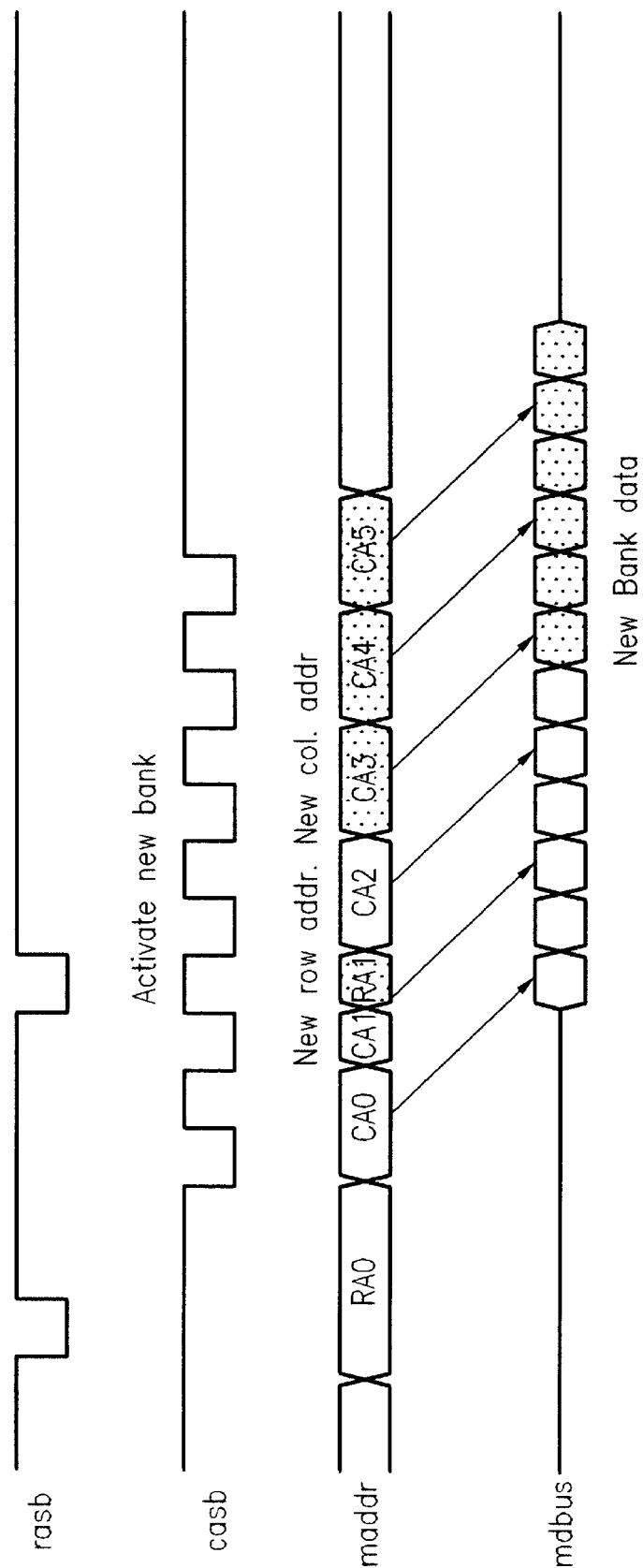
FIG. 4 is an illustration of an first example of a SDRAM READ cycle in the related art.
Figure 5:
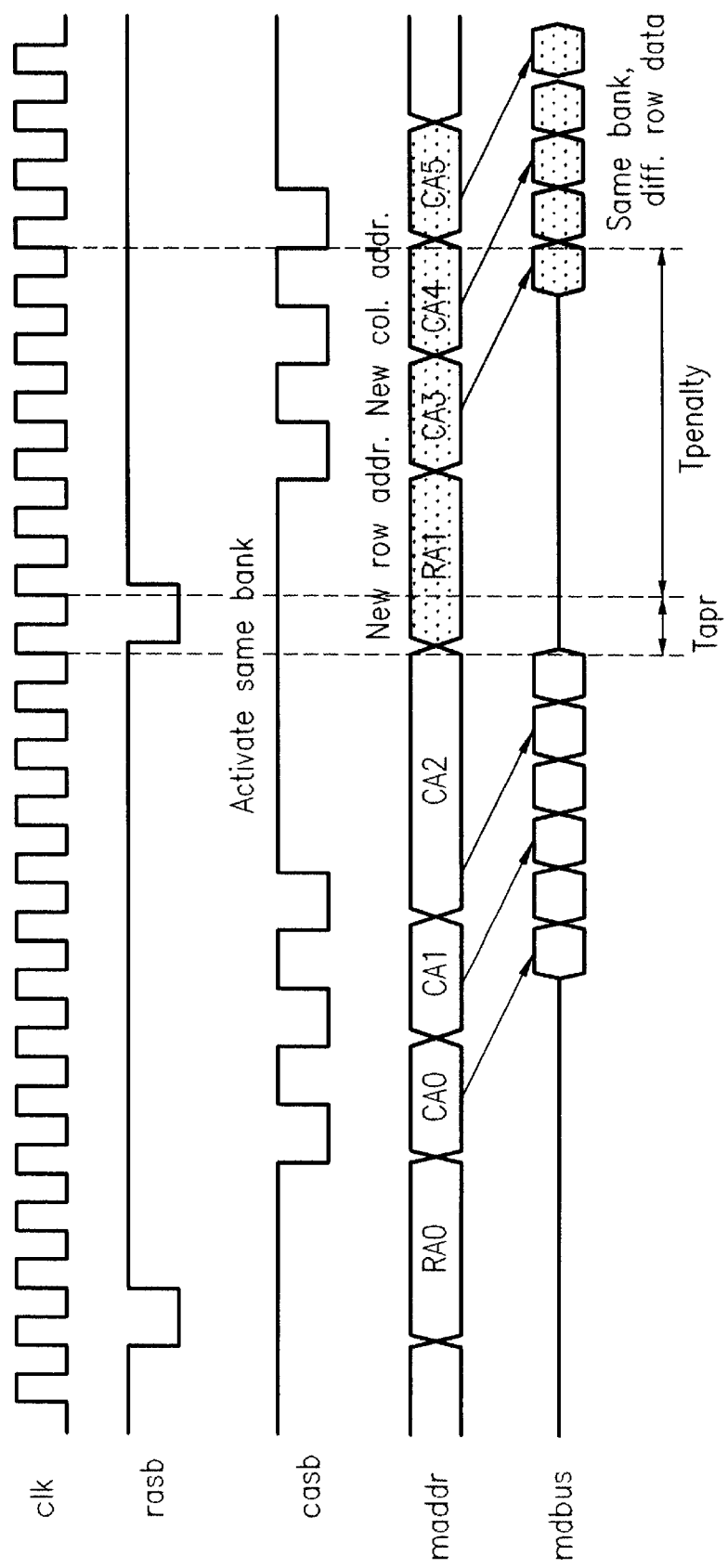
FIG. 5 is an illustration of a second example of a SDRAM READ cycle in the related art.
Figure 6:
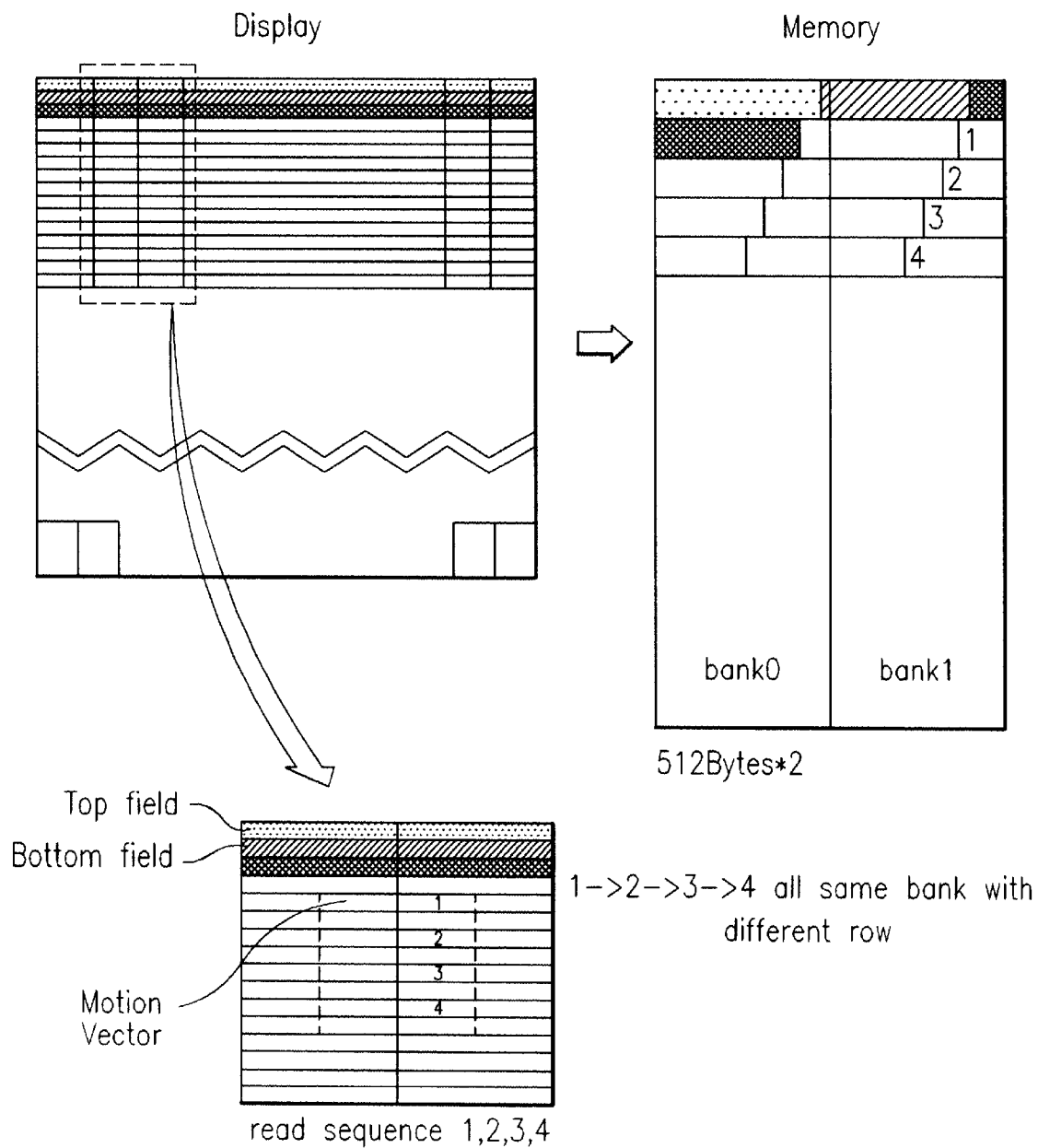
FIG. 6 is a memory map for storing a decoded image data according to the allocation method in the related art.
Figure 7:
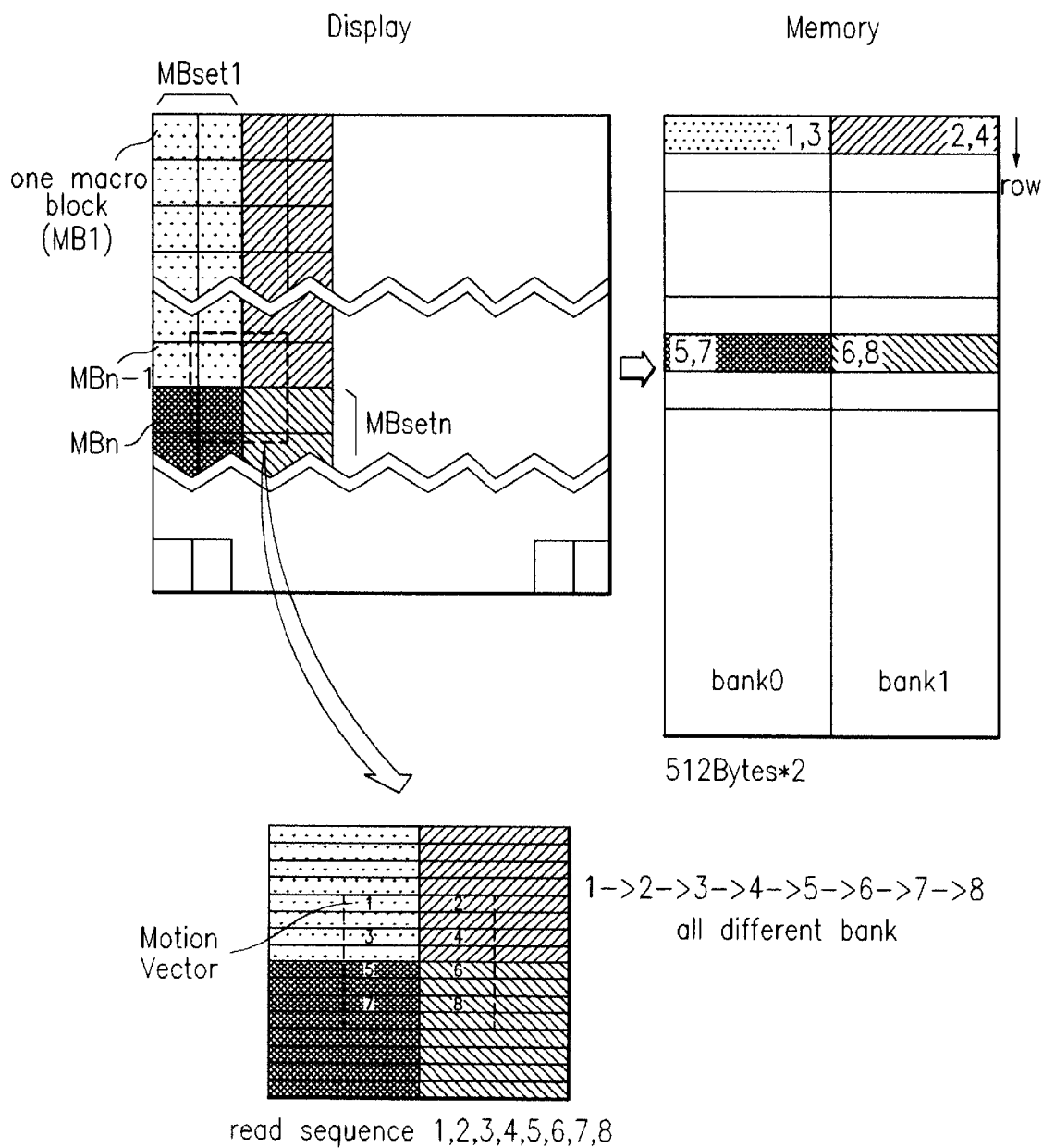
FIG. 7 is an illustration of a first example of the memory allocation method according to the present invention.

FIG. 7 shows a first embodiment of a memory allocation method according to the present invention, showing a relationship between the display image information and the memory map. The portion represented by the same hatching indicates a set of macro blocks MB1_n, and a macro block set is denoted by MBset1_n. Generally, a decoded image data is grouped into macro block sets and allocated to the memory in block sets, thereby storing the data in the memory.

A memory controller groups the decoded image data into macro block sets and stores the data block sets in the memory SDRAM. The memory controller includes a counter determining the number of macro blocks included in one macro block set; and a direction determination unit determining the direction for grouping the macro block sets, for example, in the horizontal or vertical direction, according to the number of macro blocks in the horizontal and vertical direction, and according to the memory size.

FIG. 7 shows a case where the number of macro block sets in the horizontal direction is an even number. In such case, the set of macro block sets are constructed in the vertical direction. The number of macro blocks (data size) for one set of macro blocks should be determined according to the total size of data storage capacity in one row of one bank of the memory used. Namely, the number should be the maximum number of macro blocks which can be stored in one row of the bank. In such case, a row change would not be necessary within the set of macro blocks.

At the same time, even if the necessary data are located across a plurality of macro blocks in the horizontal direction, the bank is changed without failure allowing a continuous reading and transfer of the data. Specifically, as shown in FIG. 7, when reading out the data in the order of 1, 2, 3, 4, 5, 6, 7 and 8 with respect to a designated motion vector, the data is read out from the bank0 and bank1 in an alternative manner. Although the data are stored in the same row, the data may still be read and output continuously because the consecutive data are in different banks.

However, the number of macro block sets in either the horizontal or vertical direction may be an odd or even number depending on the area of the picture and the macro block set. When the number of macro block sets in the horizontal direction is an even number, the memory allocation is achieved as described above in reference to FIG. 7. Thus, if number of macro block sets is even and the macro blocks are stored in the horizontal direction, the macro blocks are grouped in macro block sets in the vertical direction as shown in FIG. 7, eliminating the necessity to read data out from different rows of one bank.

Figure 8:
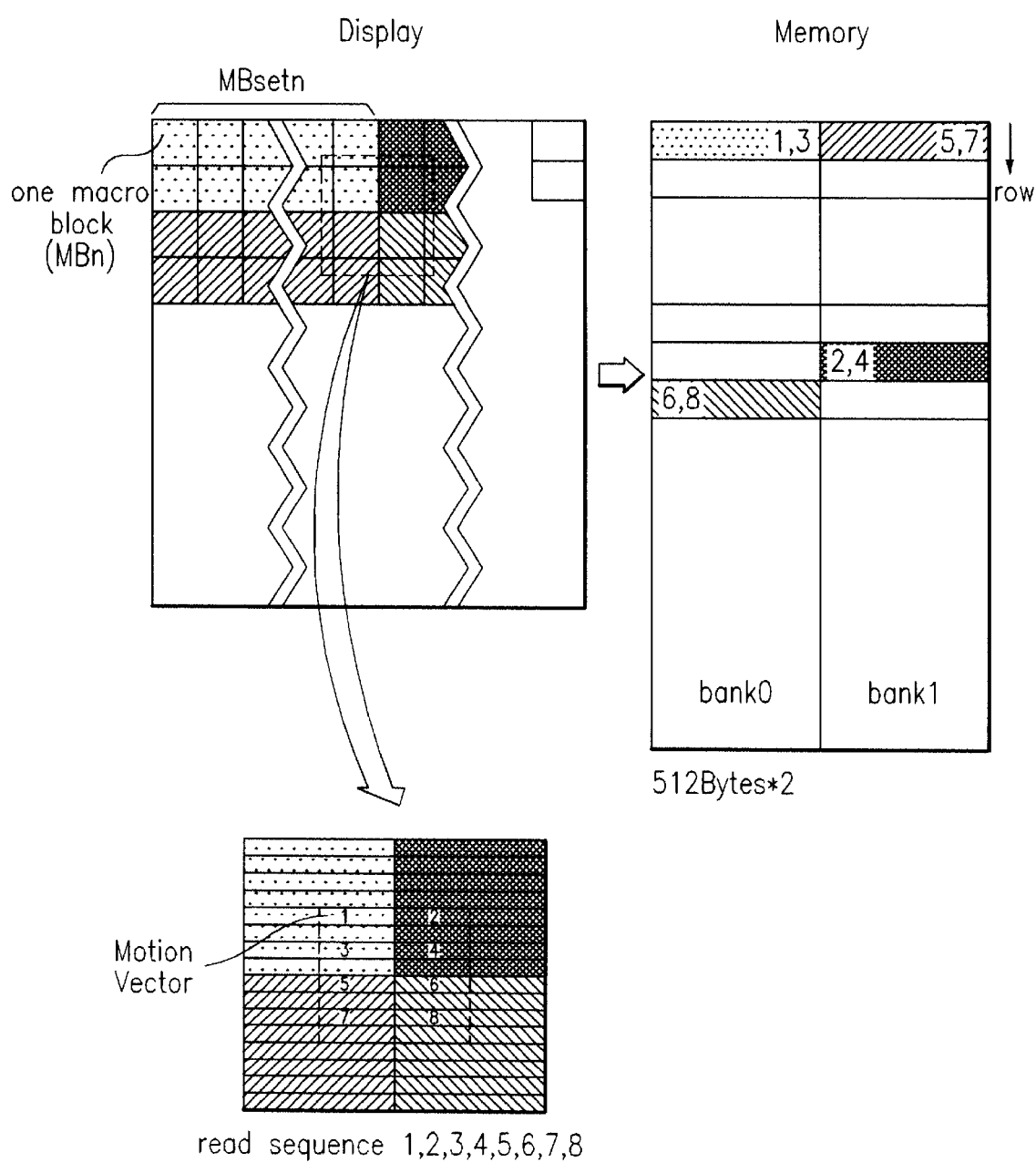
FIG. 8 is an illustration of a second example of the memory allocation method according to the present invention.

If the number of macro block sets in the horizontal direction is an odd number, the block sets are formed in the horizontal direction. Also, when the number of macro block sets in the vertical direction is an odd number, the block sets are formed in the horizontal direction, as shown in FIG. 8. When the number of macro block sets in the vertical direction is an even number, the block sets are formed in the vertical direction. When the number of macro block sets in the horizontal direction is odd and the vertical direction is even, or vice versa, the block sets can be constructed either in the horizontal or vertical direction.

Figure 9A:
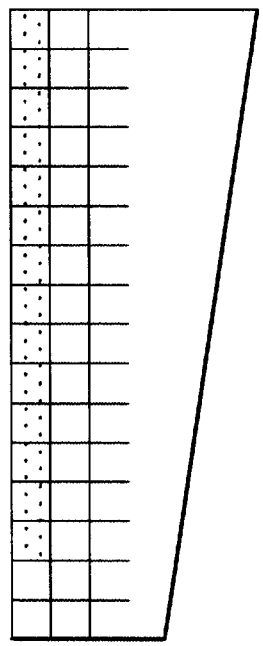
FIG. 9 is an illustration of a first example of the macro block construction method in the present invention.
Figure 9B:
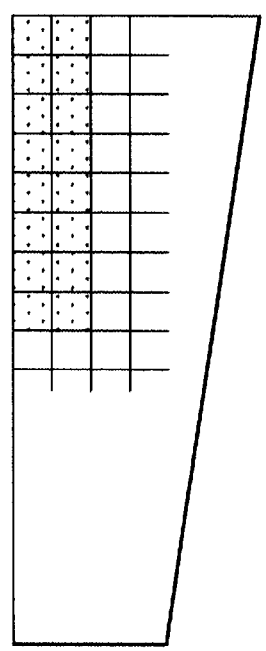
Figure 9C:
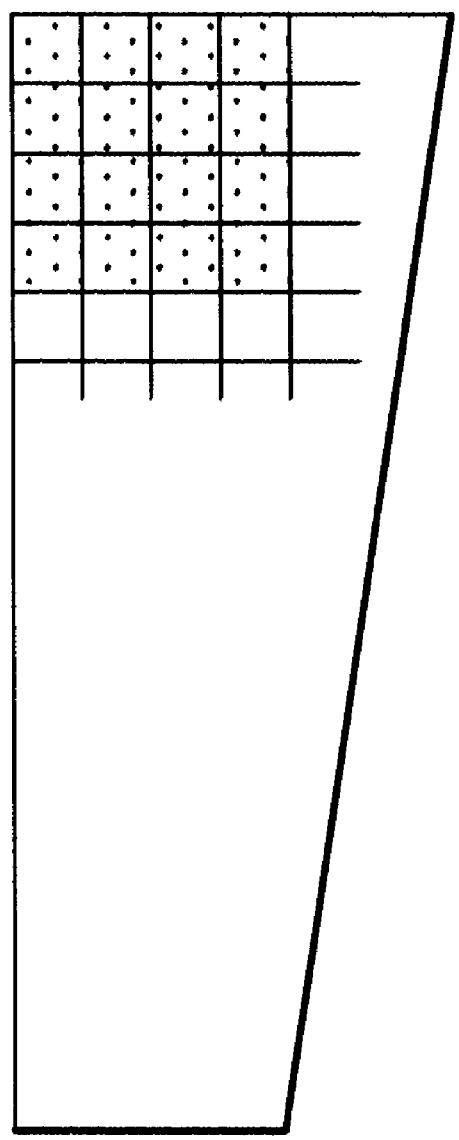

FIGS. 9(a) to (c) illustrate examples of different macro block set constructions when the macro sets are stored in the horizontal direction. When storing the macro blocks horizontally, the macro block set is constructed to include a maximum number of macro blocks in the vertical direction. Particularly, if the amount of data required at a one time is larger than the amount of data in one macro block, the macro block set is preferably constructed as illustrated in FIG. 9(b).

Figure 10A:
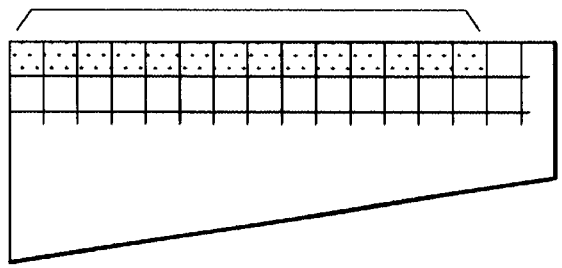
FIG. 10 is an illustration of a second example of the macro block construction method in the present invention.
Figure 10B:
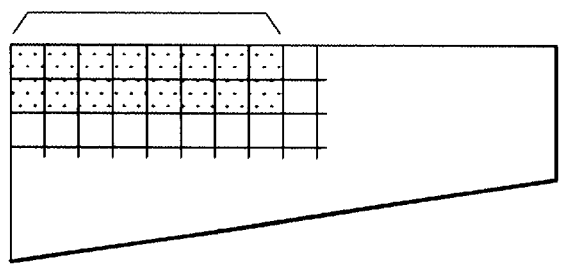
Figure 10C:
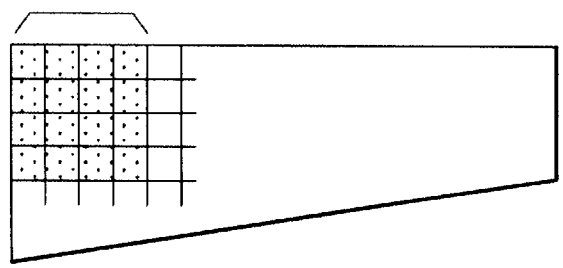

FIGS. 10(a) to (c) illustrate examples of different macro block set constructions when storing the constructed macro block set in the vertical direction. When storing the data in the vertical direction, the macro block set is constructed to include a maximum number of macro blocks in the horizontal direction. Also, if the amount of data required at a one time is larger than the amount of data in one macro block, the macro block set is preferably constructed as illustrated in FIG. 10(b).

According to the memory allocation method of the present invention, if the number of the macro blocks is even in the horizontal direction or if the number of the macro blocks is even in the vertical direction, the macro block set is formed in the vertical direction. Otherwise, the macro block set is constructed in the horizontal direction when the number of macro blocks is odd in the horizontal direction or the number of macro blocks is odd in the vertical direction. As a result, the memory allocation method of the present invention for input/output of a decoded image data reduces the waiting time required for reading out the memory data as well as decreasing the required bandwidth.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A memory allocation method comprising:
grouping a plurality of data blocks into at least one block set, wherein the grouping a plurality of data blocks further comprises,
  determining a number of macro blocks to be included in one macro set, and
  determining a direction for grouping the macro blocks, the determining the direction comprising,
    determining whether the number of macro block sets in the horizontal direction is an even number, and
    selecting a vertical direction for grouping the macro blocks if the number of macro block sets in the horizontal direction is an even number; and
storing the block sets.

2. A method of claim 1, wherein the number of macro blocks to be included in one macro set is the maximum number nearest to the allowable range of memory size.

3. A method of claim 2, wherein in the determining the number of macro blocks, the number is the maximum number of macro blocks which can be stored in one row of a bank.

4. A method of claim 1, wherein the determining a direction further comprises:
determining whether the number of macro block sets in the vertical direction is an even number; and
selecting a horizontal direction for grouping the macro blocks if the number of macro block sets in the vertical direction is an odd number.

5. A method of claim 1, further comprising:
storing the macro blocks horizontally; and
including a maximum number of macro blocks in the vertical direction when grouping the macro blocks.

6. A method of claim 1, further comprising:
storing the macro blocks vertically; and
including a maximum number of macro blocks in the horizontal direction when grouping the macro blocks.

7. A method of claim 1, wherein the determining the direction further comprises:
determining whether the number of macro block sets in the horizontal direction is an odd number; and
selecting a horizontal direction for grouping the macro blocks if the number of macro block sets in the horizontal direction an odd number.

8. A method of claim 7, wherein when the number of macro block sets in the horizontal direction is odd and the vertical direction is even, the grouping the macro blocks for construction can be in one of the horizontal and vertical directions.

9. A memory allocation apparatus comprising:
a memory having at least one bank; and
a memory controller grouping a plurality of data blocks into at least one block set and storing the block sets in the memory, wherein the memory controller comprises,
  a counter determining a number of macro blocks to be included in one macro set, and
  a direction determination unit determining a direction for grouping the macro blocks.

10. An apparatus of claim 9, wherein the number of macro blocks to be included in one macro set is the maximum number nearest to the allowable range of memory size.

11. An apparatus of claim 9, wherein the counter determines the number of macro blocks to be the maximum number of macro blocks which can be stored in one row of a bank.

12. An apparatus of claim 9, wherein the direction determination unit selects a vertical direction for grouping the macro blocks if the number of macro block sets in the horizontal direction is an even number.

13. An apparatus of claim 9, wherein the direction determination unit selects a horizontal direction for grouping the macro blocks if the number of macro block sets in the vertical direction is an odd number.

14. An apparatus of claim 9, wherein the direction determination unit selects a vertical direction for grouping the macro blocks if the number of macro block sets in the vertical direction is an even number.

15. An apparatus of claim 9, wherein the direction determination unit selects a horizontal direction for grouping the macro blocks if the number of macro block sets in the horizontal direction is an odd number.

16. An apparatus of claim 15, wherein when the number of macro block sets in the horizontal direction is odd and the vertical direction is even, the grouping the macro blocks for construction can be in one of the horizontal and vertical directions.

17. A memory allocation method comprising:
grouping a plurality of data blocks into at least one block set, wherein the grouping a plurality of data blocks further comprises,
  determining a number of macro blocks to be included in one macro set, and
  determining a direction for grouping the macro blocks, the determining the direction comprising,
    determining whether the number of macro block sets in the vertical direction is an even number, and
    selecting a horizontal direction for grouping the macro blocks if the number of macro block sets in the vertical direction is an odd number; and
storing the block sets.

18. A method of claim 17, wherein the determining a direction further comprises:
determining whether the number of macro block sets in the vertical direction is an even number; and
selecting a vertical direction for grouping the macro blocks if the number of macro block sets in the vertical direction is an even number.

* * * * *